United States Patent [19]

Bland et al.

[11] Patent Number: 4,908,278

[45] Date of Patent: Mar. 13, 1990

[54] SEVERABLE MULTILAYER THERMOPLASTIC FILM

[75] Inventors: Ralph H. Bland, St. Paul; William A. Peper, Maplewood; Bruce D. Stambaugh, St. Paul, all of Minn.

[73] Assignee: Minnesota Mining and Manufacturing Company, St. Paul, Minn.

[21] Appl. No.: 926,371

[22] Filed: Oct. 31, 1986

[51] Int. Cl.[4] .............................................. B32B 27/00
[52] U.S. Cl. ................................. 428/500; 428/516; 428/520; 428/76; 264/145
[58] Field of Search ................. 428/500, 516, 520, 76; 264/145

[56] References Cited

U.S. PATENT DOCUMENTS

| | | | |
|---|---|---|---|
| 3,480,502 | 11/1969 | Schrenk | 156/271 |
| 3,487,505 | 6/1970 | Chisholm et al. | 18/13 |
| 3,565,985 | 2/1971 | Schrenk et al. | 264/171 |
| 3,576,707 | 4/1971 | Schrenk et al. | 161/164 |
| 3,647,612 | 3/1972 | Schrenk et al. | 161/165 |
| 3,759,647 | 9/1973 | Schrenk et al. | 425/131 |
| 3,801,429 | 4/1974 | Schrenk et al. | 161/181 |

FOREIGN PATENT DOCUMENTS 27326  3/1981  Japan .
118476  9/1981  Japan .

OTHER PUBLICATIONS

J. Schrenk and T. Alfrey, Jr., *Polymer Engineering and Science*, Nov. 9, p. 397, 1969.
Eric Baer, *Scientific American*, Oct., 1986, p. 179 et. seq. at 183 & 186.

*Primary Examiner*—Edith Buffalow
*Attorney, Agent, or Firm*—Donald M. Sell; Walter N. Kirn; James V. Lilly

[57] ABSTRACT

A dispensable multilayer film having alternating layers of a ductile material, a brittle material, and optionally an intermediate layer. The film has excellent strength in its longitudinal and transverse directions but can be transversely cut by forces of less than 9 Newtons on the cutters of commercially available table top tape dispensers. At least one surface of the sheet material can be coated with a functional material.

45 Claims, 5 Drawing Sheets

SEVERABLE MULTILAYER THERMOPLASTIC FILM

TECHNICAL FIELD

This invention relates to multilayer, thermoplastic films.

BACKGROUND ART

Multilayer plastic films have been previously disclosed. For example, Japanese Patent KOKAI numbers JA56-118476 and JA56-27326 disclose oriented multilayer tape constructions containing five or less layers in the film wherein dissimilar thermoplastic materials are laminated together to form a film, the film biaxially oriented and subsequently used to make a pressure sensitive adhesive tape.

These films contain five or fewer layers due to limitations in the laminating techniques employed, e.g., film lamination, hot roll film pressing and the like. Moreover, the laminate must be oriented before being used.

Multilayer films comprising more than 5 layers are also known. See, for example, U.S. Pat. Nos. 3,480,502, 3,487,505, 3,565,985, 3,576,707, 3,647,612, 3,759,647 and 3,801,429. An important aspect of these disclosures is that iridescent multilayer articles can be produced by techniques in which two or more thermoplastic resins are joined in a multiplicity of thin layers. Some of these references also disclose that an adhesive may be used to attach these articles to a substrate. However, these references describe neither severable films nor the properties which both the film and its various components must possess in order.. to be dispensable. To the contrary, an article by one of the named inventors in these patents teaches that the combination of materials used in the present invention would not provide the film of this invention. See W. J. Schrenk and T. Alfrey, Jr., Polymer Engineering and Science, November, 9, p. 397, 1969.

Multilayer films are also discussed in an article by Eric Baer, *Scientific American,* October, 1986, p. 179 et. seq. at 183 and 186. This article discusses a sheet of alternating layers of two different polymers (one brittle and one ductile) and states that the ductile layer absorbs energy and stops crack propagation. It further states that if one component is stiff and the other rubbery the bulk material may be both stiff and tough. In both cases, the article teaches that the combination of materials used in the present invention would not provide the film of the invention.

Although multilayer films have been disclosed as discussed above, a need still remains for a severable multilayer film. For example, a severable film is desirable whenever one wishes to sever a section or length of a particular article from a wound roll. A severable film is, therefore, useful as a backing for pressure-sensitive adhesive tapes such as are used in homes and offices. Currently the films employed in such tapes are expensive, relatively difficult to dispense, or both. Additionally, many of the films used in such tapes (e.g., polypropylene, polyvinyl chloride, etc.) become substantially more difficult to dispense when the dispensing blade used becomes dull or damaged.

This dispensing difficulty manifests itself in several ways. For example, a significantly greater force may be necessary in order to bring about dispensing. Additionally, the tape or film may sever irregularly. That is, it may chip, fracture or break in an unpredictable manner rather than severing cleanly and in a straight line. The tape or film may also stretch, string out, or stress whiten at the line of severance. These difficulties are undesirable both from a functional and an aesthetic viewpoint.

A severable film is, of course, useful in a variety of other ways. It may be used as a decorative ribbon or sheet. It may be used when it is desired to remove a portion of a film or sheet from the central portion of a larger sheet. Severable films are not, however, limited to such applications. Rather they have utility wherever a severable film is desired.

DISCLOSURE OF THE INVENTION

The present invention provides a dispensable (i.e., severable) thermoplastic (i.e., repeatedly heat formable at a temperature above its glass transition temperature) film which overcomes these disadvantages. The film of the invention employs layers of at least one brittle material and at least one ductile material.

Although films of brittle materials and films of ductile materials are known, neither material by itself provides a film having the dispensability of the film of the invention. Thus, brittle films tend to chip, fracture and break irregularly and unpredictably when severed. Ductile films, on the other hand, tend to stretch, string out and stress whiten when severed. The present invention surprisingly provides a film which severs cleanly and exhibits few, if any, of these disadvantages.

The film of the invention comprises a multilayer construction of organic resins wherein a series of randomly distributed, preferably continuous, layers of a brittle material and a ductile material are stacked one on the other in a parallel array so that adjoining layers are in intimate contact with each other and so that no two adjacent layers in the film are of the same material.

For purposes of this invention a layer comprises a continuous thickness of one of the materials. Thus, even if two or more discrete thicknesses of a given material are combined together, only a single layer of that material exists.

Additionally, for purposes of this invention, the terms "dispensable" and "severable" are used interchangeably. They refer to the ability of the film to be easily and precisely cut in a straight line and exhibit little, if any, stress cracking, whitening, visible elongation, visible tailing, visible delamination or the like along the severed edge. A variety of devices and techniques can be used to sever the films of the invention. Useful devices include the dispensing blades used in commercially available table top tape dispensers such as, for example, the dispensing blades found on the Scotch Brand TM model C-40 or C-15 table top dispensers available from Minnesota Mining and Manufacturing Company of St. Paul, Minn. Other useful devices include slitting knives, die cutting devices, rotary cutting devices and the like. The preferred film of the invention may also be readily severed by being creased and then torn along the crease.

Figure 4:
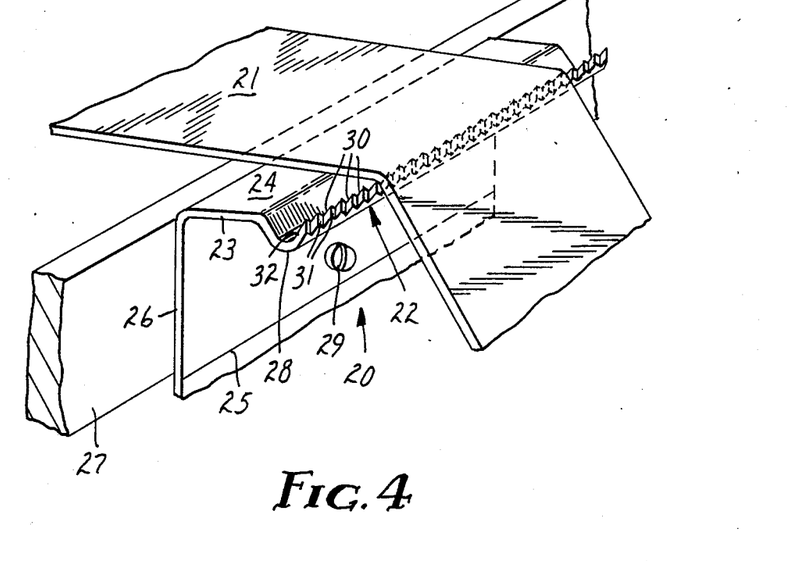
FIG. 4 is an enlarged perspective view of a cutting blade used in the test to determine severability.

A severability test, which demonstrates the severability of the film, is described in detail below with reference to FIG. 4. This test shows that the film of the invention stretches very little between the time it is contacted to a dispensing blade and the time severing occurs. Preferably, the film of the invention stretches by no more than 6.5% at severing, and more preferably by no more than 5%. This test further shows that a force of only 9 Newtons (N), preferably 8N, or less is needed to sever the film cleanly. The stretch and dispensing force referred to herein are normalized values based upon a 2 mil (0.05 mm) thick film.

The film of the invention also possesses the unique feature that it has the strength necessary to withstand forces acting on it in the plane of the film while being readily severable when subjected to forces applied in a direction normal to the plane of the film. This provides a controlled severability which enables the film to sever cleanly and in the desired direction. The film preferably possesses a yield stress of greater than $27 \times 10^3$ kilopascals (kPa), more preferably greater than $30 \times 10^{33}$ kPa.

BRIEF DESCRIPTION OF THE DRAWINGS

The present invention will be further described with reference to the accompanying drawings wherein like numbers refer to like parts in the several views and wherein.

DETAILED DESCRIPTION

The film of the invention comprises interdigitated layers of at least one ductile material, at least one brittle material and, optionally at least one intermediate material. The exact order of the individual layers is not critical to the invention provided that no two adjacent layers are of the same material and provided further that at least one layer of brittle material and at least one layer of ductile material is present.

Examples of some film structures within the scope of the invention include $B(DB)_x$ $D(BD)_x$ $D(IBID)_y$ $B(IDIB)_y$ wherein B is the brittle material, D is the ductile material, I is an intermediate material (discussed in more detail below), x is a whole number of at least 2 (preferably at least 4) and y is a whole number of at least 1 (preferably at least 2). Other arrangements of the various layers are also possible in which the recurrence of the layers is essentially random. Moreover, the top and bottom outer layers need not be of the same material.

The overall construction of the film may be varied over wide limits. Preferably, the outermost layers of the film are made up of the material having the lowest melt viscosity. This provides that the outer layers of the film will be free from flaws or aberrations caused by, for example, dimples and puckers.

Figure 1:
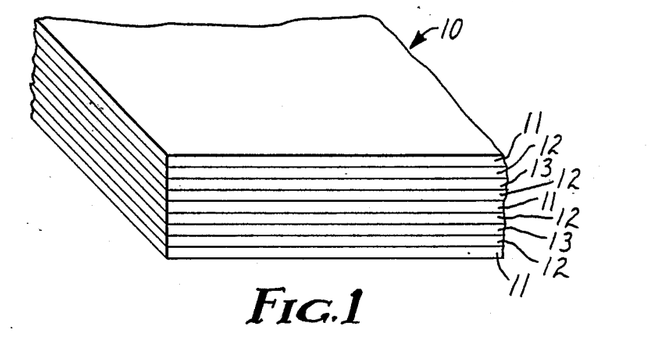
FIG. 1 is an enlarged perspective view of a length of the film of the invention.

A film of the invention having the structure $D(IBID)_y$, where y is 2 is shown in FIG. 1. The film, generally designated by the reference numeral 10, has 9 layers, and comprises alternating layers of ductile material 11, intermediate material 12 and brittle material 13. The outside layers comprise the ductile material 11. However, the structure of FIG. 1 could be such that either the brittle material 13 or the intermediate material 12 comprised the outside layers. As many layers as desired may be employed in the film. Preferably the film comprises at least 25 layers and more preferably at least 45 layers. Even more layers may be employed if desired.

The exact number of layers, the thickness of each and the resulting thickness of the film may be varied over wide limits within the scope of the invention. The thickness of the film is limited only by the handling characteristics desired. The lower practical limit is that at which the film becomes too flimsy and hard to handle, while the upper practical limit is that at which the film is too rigid and hard to sever manually. Within these constraints, however, the film of the invention typically has a thickness in the range of from 0.02 to 0.1 mm and more preferably of from 0.025 to 0.07 mm.

The thickness of the individual layers of the film may also vary, it being understood that as the number of layers increases at a given overall film thickness, the thickness of the individual layers decreases. It is further understood that at a given composition, the thickness of each layer decreases as the number of layers increases and as the total film thickness decreases. Moreover, it is possible to provide a film in which the thickness of each of the layers of each of the materials is different.

Turning now to the materials used in each of the layers, useful ductile materials have at least 100% elongation at break and preferably go through a yield at a strain rate of 100% per minute when tested in tension at 25° C. The yield is that point at which a film of the material undergoes pronounced plastic deformation upon further application of strain. Thus, the yield is manifested in a stress-strain plot at a stress point at which the strain undergoes a large increase with little, if any, increase, or a decrease in the stress level. A number of materials are useful as the ductile material. Examples of such materials include semicrystalline polymers and copolymers of alpha olefin monomers, preferably containing from 2 to 6 carbon atoms in the recurring olefin unit. Specific examples of these polymers and copolymers include polyethylene, polypropylene, polybutylene, poly 4-methylpentene, ethylene/vinyl acetate copolymer, ethylene/propylene copolymer and the like.

Examples of other classes of ductile materials useful in the present invention include polyesters (such as poly(ethylene terephthalate) and poly(butylene terephthalate)) and the like.

The quantity of ductile material utilized in the film is, of course, dependent upon the specific properties desired in the final film. However, it has been found that from 20 to 70 percent by weight ductile material is preferred. More preferably the film contains from about 30 to 55 percent by weight of the ductile material.

Brittle materials useful in the present invention are thermoplastics and have a glass transition temperature (Tg) of greater than 50° C. (preferably of greater than 70° C.). Additionally, they break before they yield and typically exhibit less than 10% elongation at break. Further, the brittle materials do not go through a yield at a strain rate of 100% per minute.

Examples of useful brittle materials include polymers and copolymers of methyl methacrylate, styrene, α-methyl styrene, ring substituted alkyl styrenes, acrylonitrile and methacrylonitrile. They generally have a melt flow index of 5 or less and are amorphous, colorless materials. These should not, however, be considered to be limiting features as brittle materials which are crystalline or which have higher melt flow indices which may be used (and may in fact be desired when the brittle material constitutes the outer layer). Moreover, colored materials may be used if so desired.

The quantity of the brittle material used in the film is dependent upon the specific properties desired. However, it has been found that from 30 to 80 percent by weight (preferably from 45 to 70 percent by weight) of the brittle material is desired.

Preferably, the film of the invention has an interlayer adhesion of at least 60 gm/cm width, more preferably at least 100 gm/cm width. However, because the film of the invention comprises a number of interleaved layers of different materials it is sometimes necessary to provide a means of increasing the interfacial adhesion between the layers to achieve the desired interlayer adhesion. A number of techniques may be used. For example, when the interfacial adhesion between the layers of brittle and ductile components is considered to be inadequate for a given use, a low concentration of a component which contains an appropriate functional (i.e., reactive) group may be incorporated into either or both of the ductile and brittle materials to promote interlayer adhesion. This may be accomplished by, for example, reacting this component with the ductile or brittle material or by copolymerizing it with the monomers used to prepare the ductile or brittle material. Examples of useful functional group-containing components which may be included to promote interlayer adhesion include acrylic acid, methacrylic acid, maleic anhydride, vinyl pyridine, oxazoline-containing materials (such as 2-isopropenyl oxazoline) and the like. For example, a film of a copolymer of 90-98 parts by weight methyl methacrylate and 10-2 parts by weight 2-isopropenyl oxazoline as a brittle material was combined with ductile materials comprising in one case a film of a copolymer of the ethylene and acrylic acid and in another case a film of a polypropylene modified with grafts of maleic anhydride. The interlayer adhesion of the resultant films was greater than 950 gm/cm width.

Alternatively, layers of an appropriate intermediate material may be utilized between the layers of brittle and ductile material. Combinations of these approaches, or even other approaches may also be used if desired.

The intermediate layer may comprise a ductile material, a brittle material, or a rubbery material. Ductile and brittle materials have been previously described. Rubbery materials are those which manifest no significant yield point, but rather typically display a sigmodial rise in elongation with applied load until rupture occurs at high strain. Whatever the precise nature of the intermediate material it must enhance the adhesion between the brittle and ductile materials.

A number of materials are useful as the intermediate material. They include ethylene/vinyl acetate copolymer (preferably containing at least about 10% by weight vinyl acetate units), carboxylated ethylene/vinyl acetate copolymer such as "CXA" 3101 available from DuPont, copolymers of ethylene and methyl acrylate such as "Poly-Eth" 2205 EMA available from Gulf Oil and Chemicals Co., ethylene/acrylic acid copolymer available from Dow Chemical Company, "Surlyn" (a copolymer of ethylene with a metal acrylate) available from DuPont, maleic anhydride modified polyolefins and copolymers of polyolefins such as the "Modic" resins available from Mitsubishi Chemical Company, polyolefins containing homogeneously dispersed vinyl polymers such as the "VMX" resins available from Mitsubishi Chemical Company (such as FN-70, an ethylene/vinyl acetate based product having a total vinyl acetate content of 50% and JN-70, an ethylene/vinyl acetate based product containing dispersed polymethylmethacrylate and having a vinyl acetate content of 23% and a methyl methacrylate content of 23%), "Polybond" (believed to be polyolefin grafted with acrylic acid) available from Reichold Chemicals Inc., "Plexar" (believed to be a polyolefin grafted with polar functional groups) available from Chemplex Company, a copolymer of ethylene and acrylic acid such as "Primacor" available from Dow Chemical Company, and a copolymer of ethylene and methacrylic acid such as "Nucrel" available from DuPont. The intermediate layer preferably comprises from 2 to 30 (most preferably from 10 to 20) weight percent of the film.

Figure 2:
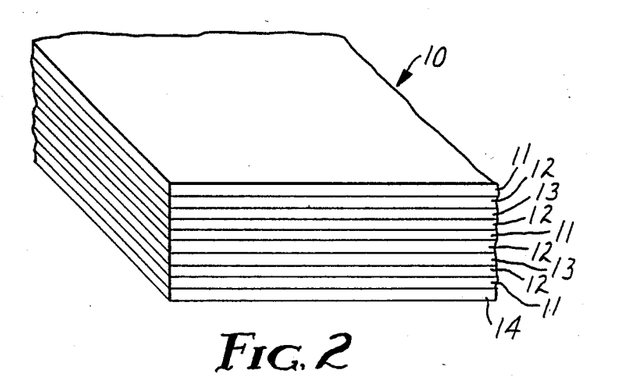
FIG. 2 is an enlarged perspective view of the film of FIG. 1 with a functional layer, here an adhesive, applied to one surface.

If desired a functional layer may be applied to one or both of the major surfaces of the film of the invention. For example, an adhesive layer 14 may be applied to at least one of the major surfaces as shown in FIG. 2. The adhesive layer 14 may be activatable by pressure, heat, solvent or any combination thereof and may be of any type such as an acrylate, a rubber/resin, or a silicone. The adhesive may be applied at conventional coating weights (e.g., 0.0014 to 0.0034 $g/cm^2$).

Other functional layers may also be employed. Thus, for example, an abrasive material (optionally in a binder), a light sensitive layer or an ink-receptive layer may be employed. Low adhesion back sizes (LAB's) which restrict adhesion of various types of surfaces to the film when it is wound as a coil or is stacked on itself may also be employed as a functional layer. Still other functional layers may be employed if desired. They may be employed singly or in combination with other functional layers on one or both sides of the film.

The film may also be treated with a conventional primer coating, and/or activated by flame or corona discharge, and/or by other surface treatment to enhance adhesion of the functional layer thereto.

The film of the invention can be readily made using techniques known in the art. One such technique is disclosed in U.S. Pat. No. 3,565,985.

In making the film of the invention, separate streams of the ductile, brittle and, optionally, intermediate materials in a flowable state are each split into a predetermined number of smaller or sub-streams. These smaller streams are then combined together in a predetermined pattern of layers of brittle, ductile and optionally intermediate materials to form an array of layers of these materials in a flowable state. The layers are in intimate contact with adjacent layers in the array. This array generally comprises a comparatively narrow but tall stack of layers. This stack is then compressed to reduce its height while being expanded to increase its width so as to arrive at a comparatively thin, wide film.

In manufacturing the films of the invention, the materials may be fed such that any of the three constitutes the top or outermost layer. Furthermore, the outermost (i.e., the top and bottom) layers generally comprise the same material.

Figure 3:
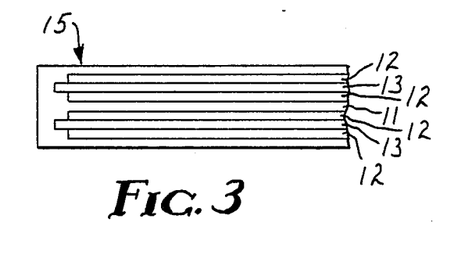
FIG. 3 is an enlarged schematic end view of a portion of another embodiment of the film of the invention.

The outermost layers also preferably form an envelope 15 around the alternating interior layers as is shown in FIG. 3. It is also preferred that the interior layers as a whole not extend to the edge of the film. This facilitates subsequent processing operations, such as slitting, or sample preparation for determination of interlayer adhesion.

The film of the invention can be used in its unoriented state or, alternatively, it can be subjected to either monoaxial orientation or biaxial orientation using techniques in the art.

The test used to determine stretch at dispensing and dispensing force will now be discussed. FIG. 4 illustrates the cutting portion of a device 20 for testing both the percent stretch and the ease and precision with which a film 21 can be cut on or dispensed over a cutting blade 22 of the type presently used on the model C-15, model C-40, or model C-41 tape dispenser sold by Minnesota Mining and Manufacturing Company of St. Paul, Minn. A pressure sensitive adhesive (about 0.002 gm/cm²) is applied to one surface of the film to facilitate testing.

The blade 22, which is formed of about 0.05 cm thick nickel plated steel, includes a rectangular land portion 23 at least as wide as the film 21 and about 0.4 cm long in the direction corresponding to the longitudinal direction of the film 21 where it extends across the blade 22. The land portion 23 defines a generally planar upper land surface 24 to which the adhesive coating of the film 21 can be temporarily adhered. The blade 22 also includes a support portion 26 at one edge of and disposed at a right angle to the land portion 23, which support portion 26 is held to the frame 27 via screw 29. A scribe line 25 is used to ensure exact positioning of the blade with respect to support 26. The blade 22 still further includes a generally U-shaped tooth portion 28 at the edge of the land portion 23 opposite the support portion 26. A row of teeth 30 is located along the distal edge of U-shaped portion 28. Each tooth 30 (1) is generally triangular, (2) has a tip in or slightly higher than the plane of the land surface 24 and spaced from the tips of adjacent teeth 30 by about 0.1 cm, (3) is defined by the intersection of distal surfaces 31 of the U-shaped portion 28 (which surfaces 31 are disposed at right angles to the land surface 24) with the upper surface 32 of the U-shaped portion 28 (which upper surface 32 is disposed at an angle of about 120° with respect to the land surface 24) and (4) has a distal tip angle measured in the plane of the land surface 24 of about 90°.

The land surface 24 is adapted to have the adhesive coating of the film 21 temporarily adhered thereto to restrain forward motion of the adhered portion of the film 21 during severing of the film 21 by the teeth 30. The blade 22 is positioned over the upper edge surface of support 27 and fixed so that the plane defined by the tips of the teeth 30 and the land surface 24 is disposed at about 10° with respect to the horizontal.

The means for pulling the film 21 at a predetermined angle and rate to sever it against the teeth 30, for determining the stretch at dispensing, and for recording the force required to sever the film 21 include a storage oscilloscope and a model 1122 Instron tensile tester. The path of movement for the crosshead is at an angle of about 30° with respect to the plane defined by the frame 27.

To test the force required to cut a particular film 21, a length of the film 21 is obtained, adhered to the planar land surface 24, positioned around the blade 22, and secured in the upper jaw of the Instron. The film extends around and is lightly tensioned against the teeth 30 on the blade 22. The drive mechanism of the Instron is then activated to move the test blade from its initial position at a rate of 25 cm/min., which movement, because of the angle at which the teeth 31 are tilted, causes tension to be applied to the film 21 extending over the teeth 30 between the land surface 24 and the upper Instron jaw beginning at one outer edge so that the film 21 is progressively transversely severed by the teeth 30.

The distance of the upper crosshead jaw from the dispensing teeth is 5 cm. The combination of the rate of movement of the jaw and the jaw separation from the dispensing teeth provides a strain rate of 500%/minute.

The force required to sever the film 21 along the teeth 30 is recorded on a Model 2090 Nicolet storage oscilloscope. The highest force reading is then determined. This is normally the initial puncture force. The sweep rate is adjusted so that the complete dispensing force versus time graph is completely displayed on the screen.

Because the angle has a large influence on the dispense values, it is important that the apparatus utilized to secure the blade be rigid, not interfere with the film whose dispensing force is being measured and securely hold the blade so angles are maintained and the tips of the blade lie in the same plane as the upper jaw faces. It is further desirable to mark the blade and the upper jaw so when the sample is positioned it is vertical between these two marks. This further ensures consistent measurements by maintaining angles precisely. At least 10 and preferably 20 measurements are made and the average force reported.

The stretch at dispensing is determined from the display on the oscilloscope. The time between the initial increase in force and the maximum force obtained as described above is recorded. This time (in minutes) is then multiplied by the strain rate of 500%/minute to give the percent stretch.

EXAMPLES 1–17

Multilayer films according to the invention were prepared using three extruders to supply three components to a single die. First and second 1¾ inch (4.4 cm) diameter single screw extruders available from HPM Corporation were used to supply the ductile and brittle materials respectively to predetermined locations in the die. These extruders had a grooved feed section and a mixing section on the screw tip. A 1¼ inch (3.2 cm) diameter C. W. Brabender single screw extruder was used to supply the intermediate material to other predetermined slots in the die. The die contained an insert comprising a linear array of adjacent slots each having an X (i.e., width) dimension of ½ inch (1.25 cm) for all layers (i.e., interior and surface) of the material used as the surface material. All other slots had an X dimension of ⅜ inch (0.94 cm). Transfer tubes connected each extruder to first, second and third distribution manifolds which in turn delivered the materials to the predetermined slots in the insert. The number of slots employed in the insert were varied to vary the number of layers in the film.

The product exiting the insert was generally rectangular in cross-section and comprised alternating layers of ductile material and brittle material with a layer of an intermediate material between each layer of ductile and brittle material. One of the materials formed an envelope around the product. After exiting the insert the product was comparatively smoothly compressed along its Y axis (i.e., its height) while at the same time being comparatively smoothly expanded along its X axis (i.e., width) direction. The now wide, relatively thin film was passed through adjustable lips in the die so as to obtain a flat film. The film was then passed into a nip formed by two water cooled steel rolls, one of which had a rubber outer sleeve, and drawn to the desired caliper by adjusting the take away rate. Alternatively, the film could be cast onto either one of the steel rolls without nipping and then drawn to the desired caliper.

The ductile material employed comprised "DyPro" 8771 polypropylene (melt index of 9 g/10 min. under ASTM D-1238 condition L, density of 0.905, melt point of 165° C., tensile at break of 34,500 kPa under ASTM D-882) available from Cosden Oil and Chemical Company. It was provided to the top and bottom slots of the stack and to every 4th slot in between the top and bottom slots.

The brittle material comprised "Plexiglas" VO44 polymethylmethacrylate resin (melt flow index of 1.7 g/10 min. under ASTM D-1228 Condition I, ultimate (tensile strength of 10,500 psi (72.4 × $10^3$ kPa), density of 1.19 under ASTM D-792, refractive index of 1.49) available from Rohm and Haas. The brittle material was first dried to remove moisture and then delivered to the third slot from each of the top and bottom slots and to every fourth slot between these two third slots.

The intermediate material comprised "Elvax" 3190 ethylene vinyl acetate copolymer from DuPont (75% ethylene/25% vinyl acetate, melt flow index of 2 g/10 min. under ASTM D-1228 condition E, yield stress 17,250 kPa). The intermediate material was provided to every other slot in the die insert.

The feed rates of each material were adjusted so as to give the nominal compositions identified in Table 1. The ductile and brittle materials were processed at a machine temperature of about 260° C. while the intermediate material was processed at a machine temperature of about 232° C.

All samples of the film had ductile material (polypropylene), as the outer layers. Examples 1-9 were made using a 25-slot die and had 7 ductile layers, 12 intermediate layers and 6 brittle layers. Examples 10-14 were made using a 45-slot die. Examples 10-12 had 12 ductile layers, 22 intermediate layers and 11 brittle layers. Examples 13 and 14 differed from Examples 10-12 in that the top two and bottom two slots of brittle material (poly(methylmethacrylate)) and the top four and bottom four slots of intermediate material (ethylene vinyl acetate) were blocked off, leaving 33 slots. The remaining top three and bottom three slots of ductile material (polypropylene) provided a single thicker outer layer of this material. As a result, the film of Examples 13 and 14 had 8 ductile layers, 14 intermediate layers and 7 brittle layers.

The films were slit to a 6 inch (15.2 cm) width, corona treated on one flat surface and then coated on the corona treated side by hand with an acrylate pressure-sensitive adhesive to a dry coating weight of 5 grains/24 in.$^2$ (0.0021 g/cm$^2$). The adhesive was used solely for purposes of holding the test samples on the land area of the test apparatus and was of the type described in Re 24,906.

The resultant samples were then tested to determine the percent stretch at dispensing, dispensing force, break elongation and yield stress values of the film. These results are also reported in Table 1. In this table the reported dispensing force has been normalized to a 2 mil (0.05 mm) thick film by multiplying the observed dispensing force by 2 mil (0.05 mm) and then dividing by the measured film thickness.

Break elongation and yield strength were determined by cutting 1 inch (2.5 cm) wide by 8 inch (20 cm) long strips from the longitudinal or machine direction of the film samples using sharp razor blades and an undamaged (i.e., scratch and dent free, etc.) resilient surface. Samples were taken from the middle and both sides of the film web. A Federal C-21 caliper gauge was used to determine the thickness of the top, middle and bottom of each sample. The thickness reported was the average of these values. Two sections of masking tape were applied across the test samples to provide a 5 inch (12.5 cm) spacing between each section. The masking tape protected the samples from damage by the jaws of the test device.

A model 1122 Instron tensile tester was used to measure the break elongation properties of the samples. A 5 inch (12.5 cm) jaw separation and a 5 inch/minute (12.5 cm/min.) separation rate with a 10 inch/minute (25 cm/min.) chart speed was used to generate a force versus elongation curve. The yield force was divided by average initial thickness to obtain the yield stress for each sample and the average of the test results reported. The break elongation was recorded directly from the chart wherein 1 inch (2.5 cm) equaled 10% elongation.

TABLE 1

| EXAMPLE | DUCTILE (WGT. %) | INTER-MEDIATE (WGT. %) | BRITTLE (WGT. %) | FILM THICKNESS (mm) | STRETCH (%) | DISPENSING FORCE (NEWTON) | BREAK ELONGATION (%) | YIELD STRESS (×$10^3$ kPa) |
|---|---|---|---|---|---|---|---|---|
| 1 | 54 | 20 | 26 | 0.049 | 4.8 | 8.1 | 165 | 29 |
| 2 | 48 | 20 | 32 | 0.047 | 4.5 | 7.2 | 124 | 31 |
| 3 | 40 | 21 | 39 | 0.057 | 4.4 | 6.7 | 66 | 34.5 |
| 4 | 35 | 21 | 44 | 0.054 | 4.6 | 4.9 | 33 | 37.9 |
| 5 | 35 | 16 | 49 | 0.053 | 4.2 | 4.6 | 30 | 37.9 |
| 6 | 60 | 5 | 35 | 0.059 | 4.9 | 7.0 | 75 | 36.6 |
| 7 | 52 | 10 | 38 | 0.061 | 4.8 | 5.4 | 83 | 34.5 |
| 8 | 47 | 16 | 37 | 0.055 | 4.9 | 6.9 | 85 | 32.4 |
| 9 | 38 | 26 | 36 | 0.054 | 4.9 | 6.4 | 87 | 31.7 |
| 10 | 54 | 10 | 36 | 0.054 | 5.5 | 7.4 | 45 | 33.1 |
| 11 | 49 | 10 | 41 | 0.053 | 5.2 | 6.7 | 35 | 37.9 |
| 12 | 46 | 9 | 45 | 0.054 | 5.0 | 6.4 | 41 | 37.9 |
| 13 | 51 | 24 | 25 | 0.059 | 6.5 | 9.8 | 147 | 26.2 |
| 14 | 36 | 20 | 44 | 0.059 | 6.1 | 7.4 | 26 | 34.5 |
| 15 | 36 | 21 | 43 | 0.055 | 4.0 | 4.8 | 60 | 39.3 |
| 16 | 31 | 20 | 49 | 0.055 | 3.6 | 4.6 | 62 | 39.3 |
| 17 | 25 | 20 | 55 | 0.054 | 3.3 | 3.7 | 12 | 44.9 |

The films of these examples severed precisely in a straight line. The samples were all clear, exhibited no iridescence, and no noticeable stress whitening or tailing at the severed end.

EXAMPLES 18-23

Multilayer films according to the invention were prepared according to the procedures and materials described in Examples 1-17 except as follows:

The brittle material was fed to the die so that it constituted the outer layers.

The films of Examples 18-20 were 25 layer films (7 brittle layers, 12 intermediate layers, and 6 ductile layers); those of Examples 21-23 were 65 layer films (17 brittle layers, 32 intermediate layers, and 16 ductile layers).

The films of examples 22 and 23 employed "Lustrex" 777 polystyrene from Monsanto Chemical Company (tensile stress of $42.8 \times 10^3$ kPa, specific gravity of 1.04) in place of the poly(methyl methacrylate) and "Escorene" 1052 polypropylene from Exxon Chemical Co. (melt flow index of 5 g/10 min., density of 0.9, yield stress of $34,500 \times 10^3$ kPa) in place of "DyPro" 8771.

The nominal compositions and thicknesses of the resulting films are given in Table 2.

The films were slit, corona treated, coated with pressure sensitive adhesive and tested for stretch at dispensing, dispensability, break elongation and yield as described in Examples 1-17. The results of these tests are also given in Table 2.

Example 27 used the same materials as Example 24 except "Modic" E 300K (believed to be a maleic anhydride modified ethylene/vinyl acetate graft copolymer and having a melt flow index of 3.5 g/10 min., density of 0.94, tensile stress of 180 kg/cm$^2$, DSC melting point of 92° C., available from Mitsubishi Petro Chemical Company) was substituted for the "Elvax" 3190.

Example 29 used the same materials as Example 24 except "Bynel" CXA 3101 (believed to be a carboxylated ethylene/vinyl acetate, available from du Pont and having a melt flow index of 3.5 and a DSC melting point of 74.5° C.) was substituted for the "Elvax" 3190.

Example 30 used the same materials as Example 24 except TD 1640 (a copolymer of ethylene and 24% methyl acrylate, melt flow index of 2 g/10 min., density of 0.947 available from Gulf Oil and Chemical Products) was substituted for the "Elvax" 3190.

Example 37 employed the brittle material as the outer layer.

These samples were tested for interlayer adhesion by cutting 1 inch (2.5 cm) wide by 8 inch (20 cm) long samples from the films using a sharp razor blade. The samples were cut from the films in the transverse direction so that one edge of the sample retained the envelope of outer material This edge was trimmed off to expose a section of film containing only ductile and brittle materials and no intermediate material. A tape having an aggressive adhesive, such as #202 masking

TABLE 2

| EXAMPLE | DUCTILE (WGT. %) | INTERMEDIATE (WGT. %) | BRITTLE (WGT. %) | FILM THICKNESS (mm) | STRETCH (%) | DISPENSING FORCE (N) | BREAK ELONGATION (%) | YIELD STRESS ($\times 10^3$ kPa) |
|---|---|---|---|---|---|---|---|---|
| 18 | 53 | 14 | 33 | 0.056 | 6.2 | 10.2 | 75 | 29.7 |
| 19 | 46 | 16 | 41 | 0.053 | 6.2 | 8.6 | 83 | 31 |
| 20 | 37 | 15 | 48 | 0.054 | 6.2 | 8.6 | 85 | 32.4 |
| 21 | 26 | 15 | 59 | 0.057 | 6.3 | 7.5 | 87 | 35.2 |
| 22 | 35 | 15 | 50 | 0.052 | 5.7 | 10.2 | 6 | 27.6 |
| 23 | 27 | 16 | 57 | 0.058 | 4.8 | 5.8 | 5 | 29 |

The films of these examples severed precisely in a straight line. None of the films exhibited any noticeable stress whitening and tailing along the severed edge.

EXAMPLES 24-37

Multilayer films according to the invention having an envelope around the film were prepared using the procedure and materials described in Examples 1-17 except as follows.

Examples 24, 26, 28 and 31-37 used "DyPro" 8771 polypropylene as the ductile material, "Elvax" 3190 ethylene vinyl acetate as the intermediate material and "Plexiglas" V044 as the brittle material.

Example 25 used the same materials as Example 24 except that "Plexar" 2 from Chemplex Company (a modified high density polyethylene) was substituted for the "Elvax" 3190.

tape available from Minnesota Mining and Manufacturing Company, was attached to the exposed faces of the sample and pulled apart to leave tails which were then secured in the separate jaws of model #1122 Instron tensile tester The jaws of the tester were then pulled apart at a separation rate of 5 in/min. (12.5 cm/min.) and the force necessary to delaminate the film was recorded When possible, the rate was then increased to 10 in/min (25 cm/min.) and the delamination force again recorded An average force for testing at least 1 inch (2.5 cm) of film was desired at each rate and the overall average of the two rate averages was reported. The ingredients, operating conditions, and test results are set out in Table 3.

The samples were also dispensed as described in Example 1 and observed for delamination. None of the samples delaminated.

TABLE 3

| EX. | DUCTILE (WGT. %) | INTERMEDIATE (WGT. %) | BRITTLE (WGT. %) | INTERLAYER ADHESION (gm/cm width) | NO. LAYERS |
|---|---|---|---|---|---|
| 24 | 61 | 10 | 29 | 89.4 | 45 |
| 25 | 43 | 21 | 36 | 160.8 | 45 |
| 26 | 53 | 10 | 37 | 69.7 | 45 |
| 27 | 42 | 25 | 33 | 89.4 | 45 |
| 28 | 30 | 30 | 40 | 71.5 | 45 |
| 29 | 39 | 22 | 39 | 139.4 | 45 |
| 30 | 45 | 27 | 28 | 42.9 | 45 |
| 31 | 35 | 25 | 40 | 84 | 45 |
| 32 | 35 | 25 | 40 | 84 | 45 |

TABLE 3-continued

| EX. | DUCTILE (WGT. %) | INTERMEDIATE (WGT. %) | BRITTLE (WGT. %) | INTERLAYER ADHESION (gm/cm width) | NO. LAYERS |
| --- | --- | --- | --- | --- | --- |
| 33 | 44 | 23 | 33 | 110.8 | 45 |
| 34 | 36 | 23 | 41 | 94.7 | 45 |
| 35 | 27 | 15 | 58 | 187.6 | 25 |
| 36 | 36 | 21 | 43 | 51.8 | 65 |
| 37 | 33 | 22 | 45 | 48.2 | 65 |

The films of Examples 24, 26, 28 and 31–37 were cut to form ¾ inch (1.9 cm) wide tapes coated on one side with a pressure sensitive adhesive and on the other side with an LAB. They were then wound into separate rolls and then each was unwound to test for interlayer delamination.

The tapes of Examples 36 and 37 demonstrated partial delamination upon unwinding. None of the other tapes demonstrated any delamination.

EXAMPLES 38–48

Multilayer films were prepared as described in Examples 1–17 and tested for dispensing force (sharp blade), percent stretch at dispensing, break elongation and yield stress. The compositions and results obtained are set out in Table 4.

In these examples, the following additional information should be noted:

Examples 38–39 were 45 layer films employing "Escorene" 3014 polypropylene available from Exxon Chemical Co. (melt flow index of 12 g/10 min., specific gravity of 0.9) as the ductile material; "Elvax" 3165 ethylene/vinyl acetate copolymer available from DuPont (melt flow index of 0.7 g/10 min., specific gravity of 0.94, 18% vinyl acetate content) as the intermediate material; and "Styron" 685 D polystyrene available from Dow Chemical Company (melt flow index of 1.6 g/10 min., specific gravity of 1.04, break stress of $42.8 \times 10^3$ kPa) as the brittle material.

The film of Example 38 was length oriented by passing it over heated (177° C.) rolls at a rate of 24 cm/min. with a differential nip speed of 2.5:1. The film of Example 39 was length oriented similarly except the differential nip speed was 5.5:1.

Example 40 was a 25 layer film which used the same materials employed in Examples 1–17. It was biaxially oriented at 3:1 (length) and 4:1 (width).

Examples 41 and 42 were 5 layer films produced using the materials of Examples 1–17 and a 25 layer die insert. In this die, the center 3 ductile material slots were blocked, the outer 2 brittle material slots top and bottom, the outer 2 intermediate material slots top and bottom and the center 2 intermediate material slots were blocked.

Examples 43–44 utilized a 25 layer die insert but no intermediate material was fed to the die. As a result, the 12 slots for intermediate material were not used and the film had only 13 layers. The ductile and brittle materials used were those used in Examples 1–17.

Examples 45–47 utilized a 13 layer film with no intermediate material. Examples 45–47 used "Poly-Eth" 2205 EMA copolymer of ethylene and methylacrylic (melt flow index of 2 g/10 min., specific gravity of 0.942) available from Gulf Oil and Chemicals Co. as the ductile material and "Plexiglas" V 920 polymethyl methacrylate available from Rohm and Haas as the brittle material.

Example 48 was 13 layer film with no intermediate material. The materials used were "Elvax" 3190 ethylene/vinyl acetate copolymer and "Styron" 430 U medium impact polystyrene (specific gravity of 1.05, yield stress $24.5 \times 10^3$ kPa). "Styron" 430 U is not a brittle material as defined herein. The "Styron" was employed as the outer material.

TABLE 4

| EXAMPLE | DUCTILE (WGT. %) | INTERMEDIATE (WGT. %) | BRITTLE (WGT. %) | FILM THICKNESS (mm) | STRETCH (%) | DISPENSING FORCE (N) | BREAK ELONGATION (%) | YIELD STRESS ($\times 10^3$ kPa) |
| --- | --- | --- | --- | --- | --- | --- | --- | --- |
| 38 | 39 | 11 | 50 | 0.099 | 6.2 | 11.2 | 161 | 61.4 |
| 39 | 39 | 11 | 50 | 0.043 | 12.8 | 43.4 | 37 | 100 |
| 40 | 41 | 18 | 41 | 0.034 | 2.7 | 4.1 | 14 | 40.0 |
| 41 | 41 | 11 | 48 | 0.048 | 7.4 | 9 | 8 | 32.5 |
| 42 | 50 | 6 | 44 | 0.05 | 8.4 | 10.4 | 10 | 33.8 |
| 43 | 46 | 0 | 54 | 0.049 | 4.3 | 5 | 17 | 52.4 |
| 44 | 59 | 0 | 41 | 0.057 | 4.9 | 4.9 | 10 | 49 |
| 45 | 71 | 0 | 29 | 0.083 | 7.6 | 6.1 | 26 | 19.3 |
| 46 | 76 | 0 | 24 | 0.06 | 9.8 | 7.6 | 50 | 16.5 |
| 47 | 66 | 0 | 34 | 0.066 | 6.6 | 5.4 | 3 | 22.8 |
| 48 | 62 | 0 | 38 | 0.053 | 36 | 9.8 | 59 | 15.2 |

The films of Examples 38 (length oriented), 40 (biaxially oriented), and 43–47 (13 layers) exhibited no iridescence and severed cleanly in a straight line with no noticeable stress whitening or tailing along the severed edge.

The film of Examples 39 and 46 exhibited unacceptable stress whitening and tailing along the severed edge.

Examples 41, 42 and 45 exhibited less stress whitening and tailing along the severed edge.

Example 48 was totally unacceptable and exhibited film elongation, gross tailing and stress whitening along the severed edge. This example demonstrates the need for both the brittle and ductile materials in the film.

EXAMPLE 49

Comparative

The normalized force required to provide acceptable dispensing of a number of backing of commercially available pressure sensitive adhesive tapes was determined and compared to the normalized dispensing force of the film of the invention. The results are reported in Table 5. Dispensing forces using both sharp blades and "dull" blades were measured. The procedures used were the same for each determination. The "dull" blade was prepared by lightly filing the points off of a sharp blade to simulate a blade which had been dulled through actual use.

TABLE 5

| PRODUCT TESTED | DISPENSING FORCE (N) | | RATIO DULL/SHARP |
|---|---|---|---|
| | SHARP BLADE | "DULL" BLADE | |
| #810-1 | 3.6 | 4.3 | 1.2 |
| #810-2 | 2.9 | 4.0 | 1.4 |
| #810-3 | 2.9 | 3.4 | 1.2 |
| #810-4 | 2.2 | 3.1 | 1.4 |
| #810-5 | 2.9 | 4.5 | 1.6 |
| #810-6 | 2.8 | 4.4 | 1.6 |
| #810-7 | 2.8 | 5.6 | 2.0 |
| #600-1 | 14.2 | 50.9 | 3.6 |
| #600-2 | 6.6 | 35.6 | 5.4 |
| #600-3 | 10.1 | 43.0 | 4.3 |
| #600-4 | 9.7 | 40.5 | 4.2 |
| #600-5 | 8.7 | 40.1 | 4.6 |
| #600-6 | 10.3 | 40.9 | 4.0 |
| #600-7 | 10.5 | 40.9 | 3.9 |
| #610-1 | 6.2 | 18.7 | 3.0 |
| #610-2 | 3.5 | 17.1 | 4.9 |
| #610-3 | 4.5 | 15.9 | 3.5 |
| #610-4 | 4.8 | 17.9 | 3.7 |
| #610-5 | 5.0 | 19.5 | 3.9 |
| #610-6 | 4.9 | 18.6 | 3.8 |
| #610-7 | 4.7 | 18.5 | 3.9 |
| Ex. 1 | 8.1 | 16.7 | 2.1 |
| Ex. 2 | 7.2 | 11.1 | 1.7 |
| Ex. 3 | 6.7 | 9.6 | 1.4 |
| Ex. 5 | 4.6 | 7.4 | 1.6 |
| Ex. 7 | 5.4 | 8.8 | 1.6 |
| Ex. 9 | 6.4 | 9.0 | 1.4 |
| Ex. 11 | 6.7 | 10.4 | 1.6 |
| Ex. 13 | 9.8 | 14.4 | 1.5 |
| Ex. 15 | 4.8 | 14.5 | 3.0 |
| Ex. 17 | 3.7 | 8.1 | 2.1 |
| Ex. 19 | 8.6 | 14.1 | 1.6 |
| Ex. 23 | 5.8 | 7.5 | 1.3 |
| Ex. 38 | 11.2 | 31.7 | 2.8 |
| Ex. 40 | 4.1 | 30.5 | 7.4 |
| Ex. 42 | 10.4 | 11.2 | 1.1 |
| Ex. 44 | 4.9 | 7.4 | 1.5 |
| Ex. 46 | 7.6 | 7.7 | 1.0 |

No. 810, No. 600 and No. 610 tapes are available from the Minnesota Mining and Manufacturing Company. The 810 tape employs a cellulose acetate film backing. The 600 tape employs an oriented, unplasticized polyvinyl chloride film backing. The 610 tape employs a cellophane film backing. The designation following each product number in Table 4 represents a different roll of the tape.

The data show that sharp to "dull" blade dispensability of the films of the invention is generally equivalent to that of the No. 810 product. The data also show that the film of the invention is significantly less difficult to dispense on a "dull" blade than are either of the No. 600 or No. 610 tapes.

EXAMPLE 50

Figure 5:
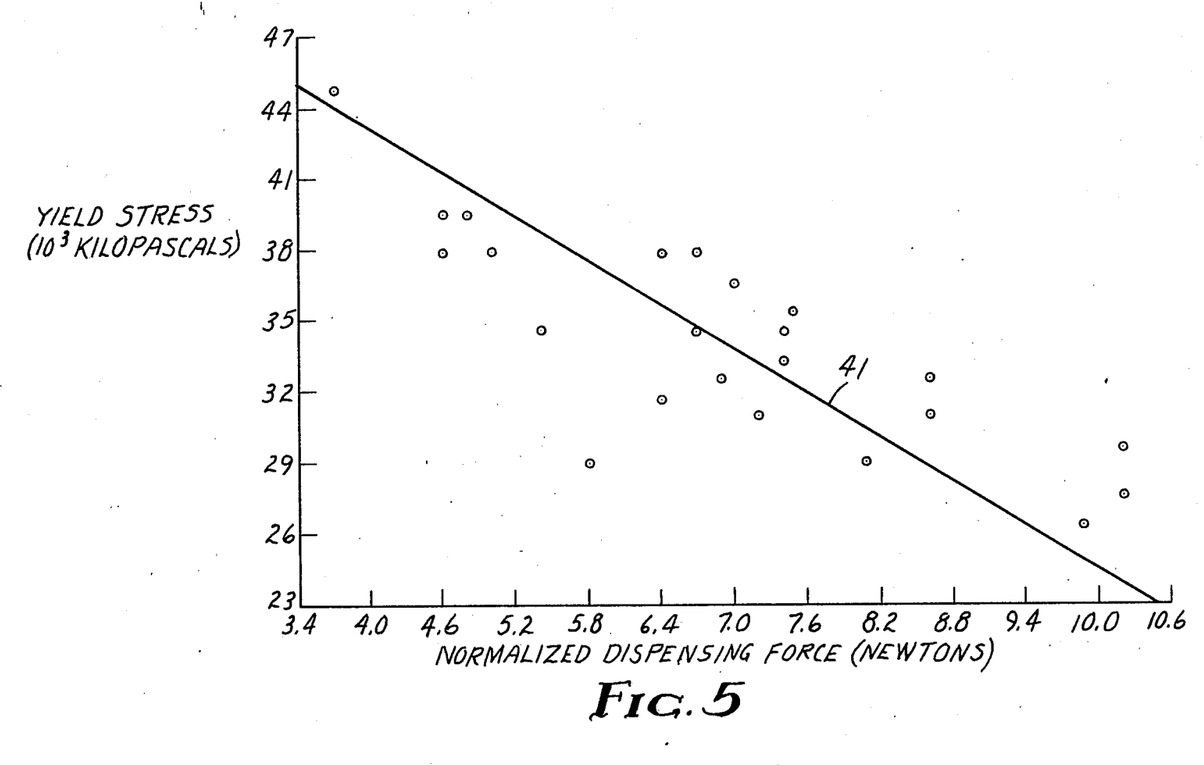
FIG. 5 is a plot of normalized dispensing force versus yield stress of the film backing.

A plot (line 41 of FIG. 5) was made of dispensing force versus yield using the data from Examples 1-23. A linear regression analysis of this plot shows an $R^2$ correlation of 63.4%. The following observations can be made:

(1) A film having a normalized dispensing force of 9N has a yield stress of $27.7 \times 10^3$ kPa.
(2) As yield stress increases, normalized dispensing force decreases.
(3) At the preferred minimum yield stress of $30 \times 10^3$ kPa, the film possesses a maximum dispensing force of 8.1N.

EXAMPLES 51-54

A series of multilayer films according to the invention were prepared using the procedures and materials described in Examples 1-17. These films were used to prepare die cut label stock. A 43 pound silicone coated paper was coated with a solvent-based acrylic adhesive (0.02 mm dry thickness), oven dried and then laminated to the multilayer films.

The resulting label stock was rotary die cut on a Mark Andy flexographic press (Model 830) at 200 ft./min. (60 meters/min.). The label stock severed cleanly and exhibited no stress whitening or tailing. The die cut portions of the label stock (i.e., the labels) dispensed readily at high speed indicating that there was no adhesive pushed into the liner during the die cutting operation. The composites of Examples 51 and 52 exhibited the best results. Table 6 shows the multilayer films used.

TABLE 6

| EX. | DUCTILE (WGT. %) | BRITTLE (WGT. %) | INTERMEDIATE (WGT. %) | NO. LAYERS | OUTER MATERIAL | DIE CUTTING CHARACTERISTICS |
|---|---|---|---|---|---|---|
| 51 | 45 | 9 | 46 | 45 | DUCTILE | EXCELLENT |
| 52 | 35 | 21 | 44 | 25 | DUCTILE | EXCELLENT |
| 53 | 38 | 13 | 49 | 25 | BRITTLE | GOOD-EXCELLENT |
| 54 | 43 | 16 | 41 | 25 | BRITTLE | GOOD |

What is claimed is:

1. A thermoplastic, severable film having a plurality of randomly occurring parallel layers of a brittle thermoplastic polymeric material having a glass transition temperature of greater than 50° C., and a ductile polymeric material having at least 100% elongation at break situated one on the other in an array, said array comprising the product of a steam of each of said materials which, independently, has been split into a predetermined number of substream and said substreams subsequently recombined to form said array,
wherein no two adjacent layers of said array are of the same material, and
wherein each of said layers has sufficient adhesion to said adjacent layers to enable said film to be severed precisely in a straight line.

2. A severable film according to claim 1 comprising at least five of said layers.

3. A severable film according to claim 1 having a stretch at dispensing of no more than 6.5%.

4. A severable thermoplastic film having a stretch at dispensing of no more than 6.5% said film comprising at least five layers situated one on the other in a parallel array, said layers occurring essentially randomly in said array and being individually selected from a brittle thermoplastic polymeric material having a glass transition temperature of greater than 50° C., and a ductile polymeric material having at least 100% elongation at break, wherein no two adjacent layers are of the same material, and wherein each of said layers has sufficient adhesion to said adjacent layers to enable said film to be severed precisely in a straight line.

5. A severable film having at least five alternating, parallel layers of dissimilar materials, wherein no two adjacent layers are of the same material, and wherein each layer comprises either a brittle thermoplastic polymeric material having a glass transition temperature of greater than 50° C., or a ductile polymeric material having at least 100% elongation at break, and wherein said film has a stretch at dispensing of no more than 6.5%, and wherein each of said layers has sufficient adhesion to said adjacent layers to enable said film to be severed precisely in a straight line.

6. A severable film having at least five layers comprising randomly occurring layers of a brittle thermoplastic polymeric material having a glass transition temperature of greater than 50° C., a ductile polymeric material having at least 100% elongation at break and optionally an intermediate material which enhances the adhesion between the brittle and ductile materials, wherein no two adjacent layers are of the same material, said film stretching by no more than 6.5% when wherein each of said layers has sufficient adhesion to said adjacent layers to enable said film to be severed precisely in a straight line.

7. A severable film according to claim 1, 4, 5 or 6 having a yield stress of at least $27 \times 10^3$ kilopascals (kPa).

8. A severable film according to claim 1, 4, 5 or 6 requiring a normalized force of no more than 9 Newtons (N) to sever said film.

9. A severable film according to claim 1, 4, 5 or 6 wherein said ductile material comprises a semicrystalline polymer.

10. A severable film according to claim 9 wherein said ductile material is selected from polyester and polymers and copolymers of alpha olefin monomers.

11. A severable film according to claim 10 wherein said ductile material is selected from polymers and copolymers of alpha olefin monomers.

12. A severable film according to claim 11 wherein said alpha olefin monomers are selected from ethylene, propylene, butylene, 4-methylpentene, ethylene/vinyl acetate copolymer, and ethylene/propylene copolymer.

13. A severable film according to claim 12 wherein said alpha olefin monomer is propylene.

14. A severable film according to claim 1, 4, 5 or 6 wherein said ductile material comprises from 20 to 70 percent by weight of said film.

15. A severable film according to claim 1, 4, 5 or 6 wherein said brittle material has less than 10% elongation at break.

16. A severable film according to claim 15 wherein said brittle material is selected from polymers and copolymers of methyl methacrylate, styrene, α-methyl styrene, ring substituted alkyl styrenes, acrylonitrile, and methacrylonitrile.

17. A severable film according to claim 16 wherein said brittle material is selected from polymers and copolymers of methyl methacrylate.

18. A severable film according to claim 17 wherein said brittle material is polymethyl methacrylate.

19. A severable film according to claim 15 wherein said brittle material comprises from 30 to 80% by weight of said film.

20. A severable film according to claim 1, 4, 5 or 6 having an interlayer adhesion of at least 60 g/cm width.

21. A severable film according to claim 1, 4 or 5 further comprising one or more layers of an intermediate material which enhances the adhesion between the brittle and ductile materials.

22. A severable film according to claim 21 wherein said intermediate material is selected from ethylene/vinyl acetate copolymer, copolymers of ethylene and methyl acrylate, copolymers of ethylene and acrylic acid, and maleic anhydride modified polyolefins and copolymers of polyolefins.

23. A severable film according to claim 22 wherein said intermediate material is a copolymer of ethylene and vinyl acetate.

24. A severable film according to claim 23 wherein said ethylene/vinyl acetate copolymer contains at least about 10% by weight vinyl acetate units.

25. A severable film according to claim 21 wherein said intermediate material comprises from 2 to 30% by weight of the film.

26. A severable film according to claim 6 wherein said intermediate material comprises from 2 to 30% by weight of said film.

27. A severable film according to claims 1, 4, 5 or 6 having a structure selected from $$D(BD)_x \text{ and } B(DB)_x$$

wherein D is a ductile material, B is a brittle material, and x is at least 2.

28. A severable film according to claim 1, 4, 5 or 6 having at least 25 layers.

29. A severable film according to claim 28 having at least 45 layers.

30. A severable film according to claim 29 having at least 65 layers.

31. A severable film according to claim 1, 4, 5 or 6 wherein a layer of a first functional material is applied to at least one surface thereof.

32. A severable film according to claim 31 wherein said first functional material comprises an adhesive.

33. A severable film according to claim 32 wherein said adhesive comprises a pressure sensitive adhesive.

34. A severable film according to claim 31 wherein said first functional material comprises an abrasive material.

35. A severable film according to claim 34 wherein an adhesive is applied to the surface opposite the surface bearing said abrasive material.

36. An oriented film according to claim 1, 4, 5 or 6.

37. A biaxially oriented film according to claim 1, 4, 5 or 6.

38. A severable film having a plurality of randomly occurring parallel layers of a brittle thermoplastic polymeric material having a glass transition temperature of greater than 50° C., and a ductile polymeric material having at least 100% elongation at break situated one on the other in an array, wherein one of said materials forms an envelope around said array.

39. A severable film according to claim 38 wherein said ductile material forms said envelope.

40. A severable film according to claim 1, 4, 5 or 6 wherein one of said materials forms an envelope around said film.

41. A severable film according to claim 40 wherein said ductile material forms said envelope.

42. A method of making a severable, thermoplastic film containing alternating layers of a ductile polymeric material having at least 100% elongation at break, a brittle thermoplastic polymeric material having a glass transition temperature of greater than 50° C., and, optionally, an intermediate material capable of enhancing the adhesion between the brittle and ductile materials comprising the steps of providing an individual stream of each material in a flowable state, separating each said individual stream into substreams of said materials in said flowable state, the number of substreams being individually predetermined for each stream, combining said substreams to form an array of randomly occurring parallel layers of said materials in intimate contact with adjacent layers of said materials, wherein the outermost of said materials forms an envelope around said film, and cooling said film to a non-flowable state.

43. A severable film according to claim 1, 4, 5 or 6 wherein said layers comprise only said ductile material and said brittle material and wherein at least one of said materials has been combined with a component which contains a group reactive with said other material.

44. A severable film according to claim 43 wherein said brittle material contains a component reactive with said ductile material.

45. A severable film according to claim 44 wherein said component is selected from acrylic acid, methacrylic acid, maleic anhydride, vinyl pyridine and oxazoline-containing materials.

* * * * *

UNITED STATES PATENT AND TRADEMARK OFFICE
CERTIFICATE OF CORRECTION

PATENT NO. : 4,908,278
DATED : MARCH 13, 1990
INVENTOR(S) : BLAND ET AL.

It is certified that error appears in the above-identified patent and that said Letters Patent is hereby corrected as shown below:

Column 1, line 33, "order.." should be —order—.

Column 11, line 17, "103" should be —$10^3$—.

Column 11, line 56, "″Elvax″" should be —"Elvax"—.

Column 12, line 47, "recorded" should be —recorded.—.

Column 12, line 49, "recorded" should be —recorded.—.

Column 14, line 20, "methylacrylic" should be —methyl acrylate—.

Column 16, line 53, "substream" should be —substreams—.

Column 17, line 29, after "when" insert —dispensed, and—.

Signed and Sealed this

Thirtieth Day of July, 1991

Attest:

HARRY F. MANBECK, JR.

*Attesting Officer*   *Commissioner of Patents and Trademarks*